United States Patent [19]

Jones

[11] 4,084,828

[45] Apr. 18, 1978

[54] BELL-AND-SPIGOT CONCRETE PIPE JOINT WITH PLASTIC LINER RING

[75] Inventor: David P. Jones, Indianapolis, Ind.

[73] Assignee: Construction Products Corporation, Indianapolis, Ind.

[21] Appl. No.: 708,591

[22] Filed: Jul. 26, 1976

[51] Int. Cl.² .............................................. F16L 21/02
[52] U.S. Cl. ....................... 277/207 A; 277/DIG. 2; 285/230; 285/291
[58] Field of Search ................. 277/207 A, 214, 215, 277/DIG. 2; 285/54, 112, 230, 231, 232, 284, 288, 290, 291, 292, 296

[56] References Cited

U.S. PATENT DOCUMENTS

| 2,982,569 | 5/1961 | Miller et al. | 277/207 A UX |
| 3,135,519 | 6/1964 | Ligon et al. | 277/207 A UX |
| 3,415,544 | 12/1968 | Hucks | 285/230 X |
| 3,738,689 | 6/1973 | Forni | 285/230 X |
| 3,829,135 | 8/1974 | Forni | 285/230 X |
| 3,858,912 | 1/1975 | Bower | 285/230 |
| 3,866,925 | 2/1975 | Maimstrom et al. | 285/230 X |

FOREIGN PATENT DOCUMENTS

| 1,930,513 | 1/1970 | Germany | 285/230 |
| 1,347,701 | 2/1974 | United Kingdom | 285/230 |

*Primary Examiner*—Robert S. Ward, Jr.
*Attorney, Agent, or Firm*—Jenkins, Coffey & Hyland

[57] ABSTRACT

A thin-walled joint face liner ring providing a smooth and continuous face is applied to the bell or to both the bell and the spigot of concrete pipe. The outer end of the ring is formed as a reversely curved flange so that its edge enters and is buried in the concrete. Its inner end extends part way outward along the shoulder of the pipe and thence axially so that its edge also enters and is buried in the concrete. Each ring is applied by placing it on the usual joint face-forming portions of the pipe mold, casting the concrete against the ring and about its edges, and subsequently curing the concrete in place against the ring or rings. When used on the spigot face, it can be made to form the usual gasket groove at such end, and thereby permit use of a more simple mold structure.

22 Claims, 7 Drawing Figures

4,084,828

BELL-AND-SPIGOT CONCRETE PIPE JOINT WITH PLASTIC LINER RING

BACKGROUND OF THE INVENTION

This invention relates to molded pipe, such as that molded from concrete, which is cured without being fired. Such pipe, especially for low-pressure applications, is joined end-to-end by fitting the spigot end of each section in the bell end of the next and sealing the joint with a gasket. In the manufacture of such concrete pipe, roughness and unevenness and voids tend to occur at the joint faces, especially at the joint face at the bell end of the pipe, and even when such faces are well formed, their concrete surfaces are abrasive and can tend to abrade the sealing gaskets as the pipes are joined.

As is known, such pipe has a tubular wall with an enlarged bell at one end. Such bell has an inner joint face presented radially inward, which is of generally cylindrical shape, but has a slight draft taper and commonly has an outward-diverging entrance mouth of greater taper at its outer end. The joint face extends from the end face of the pipe to a shoulder at the inner end of the bell. Similarly, the spigot end of the pipe has a joint face presented radially outward, and extending from the end face of the pipe to a shoulder at the inner end of the spigot. This joint face is generally cylindrical, with a slight draft taper, but has a gasket groove formed in it, and commonly has an outward-converging guide or pilot portion at its outer end.

Such concrete pipe is commonly made by compacting concrete against an outer mold shell from the inside, and the bell-end joint face is formed by placing in the end of the shell a bell mold ring having its outer face formed to define the inward-presented bell joint face. The pipe bell is formed between that ring at the inside and the jacket at the outside. This bell mold space is accessible only from its inner end, and this makes it difficult to form the joint face against the surface of the bell mold ring, without irregularities and voids. In addition, when the bell mold ring is withdrawn from the molded bell, its relative axial movement along the joint face may produce serrations or other roughness. The spigot end of the pipe, with its radially-open gasket groove, requires a special mold made of several separable pieces. This tends less to produce joint surface roughness, but increases the complexity of the mold structure and of the molding process. In any case, the cast concrete surfaces at the joint faces may be abrasive.

The present invention facilitates molding the joint face at the bell end of the pipe, eliminates roughness and voids at the bell joint face, and provides a smooth, continuous, and well-formed joint face with a non-abrasive surface for engagement with the sealing gasket. At the spigot end, the present invention likewise provides a well-formed, non-abrasive surface, but it also serves to define and form the gasket groove, and this permits use of a simpler mold structure.

In accordance with the invention, the joint face at the bell end of the pipe section, or both that bell joint face and the spigot joint face, is lined with a preformed liner ring of plastics material, which lies tight against the joint face and preferably has its edges buried and locked in the body of the concrete which is molded against it. Each liner ring includes a generally axially extending portion which overlies and forms a facing on the molded concrete joint face. This face-forming portion is joined at its outer end to a flange which extends along the end face of the pipe and is then turned back on itself into that end face so as to extend into and be buried and locked in the body of the concrete. At the opposite end of the ring, the face-forming portion of the liner ring joins a flange which extends radially along the face of the bell or spigot shoulder for a short radial distance and then turns axially to form a generally axial collar at the edge of the ring which extends into and is buried in the body of the concrete.

In accordance with the invention, concrete pipe sections are made by mounting a preformed liner ring on the usual bell mold ring of the pipe mold, or both on that bell mold ring and on the spigot mold structure, and molding the concrete in the mold in the usual way. The concrete is compacted against the liner ring or rings instead of directly against the mold surfaces, and is molded against and about the edges of the liner ring to bury those edges in the concrete and lock the ring to the body of concrete with its face-forming portion at the joint face of the pipe.

At the spigot end, the preformed liner ring is desirably formed with the gasket groove in it. Such ring may be supported on the usual separable-part core ring and related mold structure. However, since the liner ring already contains and defines the outwardly open gasket groove, it may itself serve as the mold for such groove and may be supported in the mold structure by a suitable support and the usual groove-forming separable core ring may be omitted.

The liner rings are desirably thin-walled rings, as from about 0.030 inch to about 0.100 inch in thickness, and preferably from 0.040 inch to 0.050 inch thick. The rings are not normally intended to provide mechanical strength, but to serve merely as facings which are physically supported in place and in the desired configuration by the body of concrete against which they lie as facings and which is molded in place against them while they are supported by suitably shaped mold surfaces. When a spigot liner ring is relied on as the mold for the gasket groove, a greater wall thickness within the above-indicated range may be used to provide adequate, self-sustaining rigidity. While such range is now preferred, it is contemplated that even greater wall thicknesses may be used, up to about 0.200 inch, if desired.

The liner rings may be made of any of a wide variety of plastics materials and by any of various conventional forming processes. One desirable procedure is to make the rings of thermoplastic sheet material, by thermoforming the sheet against a suitable die under vacuum.

BRIEF DESCRIPTION OF THE DRAWINGS

The accompanying drawings illustrate the invention, and show a preferred embodiment exemplifying the best mode presently contemplated by the inventor of carrying out his invention. In such drawings.

DETAILED DESCRIPTION OF THE PREFERRED EMBODIMENT(s)

Figure 1:
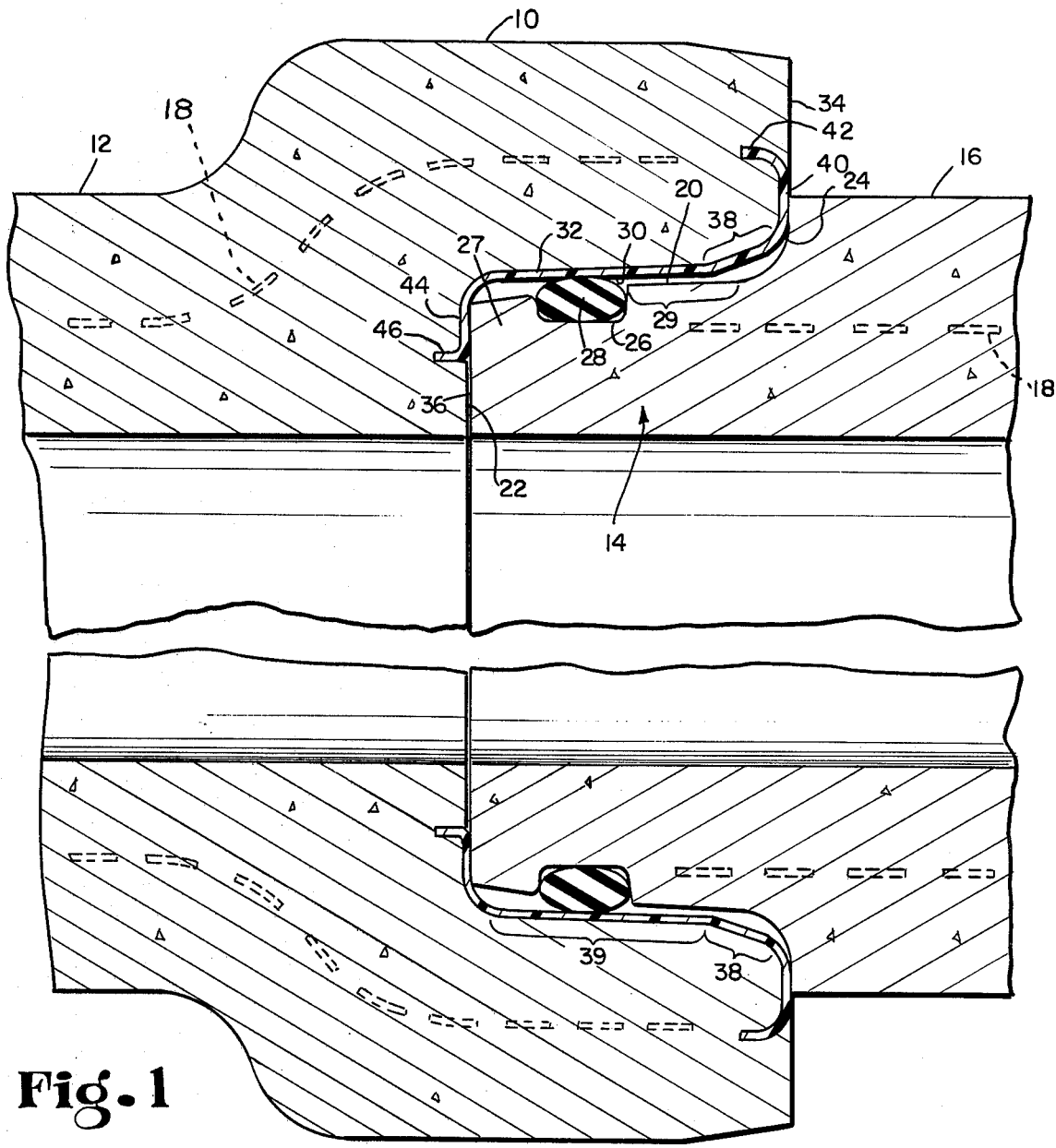
FIG. 1 is a longitudinal sectional view of a pipe joint between a pipe bell having a liner ring in accordance with the present invention and a pipe spigot of conventional construction.

The pipe joint shown in FIG. 1 comprises a joint between the bell 10 of a pipe 12 and the spigot 14 of an identical pipe 16. Each pipe is formed of a cast concrete wall containing a metal reinforcing mesh 18 which lies intermediate its thickness and extends longitudinally of the pipe. At the bell end the reinforcement is flared and offset outward to lie intermediate the thickness of the bell 10.

The spigot 14 of the pipe 16 is of conventional construction. It comprises a joint face 20 which faces radially outward and extends generally axially from the end face 22 of the pipe 16 to a shoulder 24 in a plane normal to the axis of the pipe. The joint face 20 contains a molded gasket groove 26 in which a gasket 28 is seated in use. The main portion 29 of the face 20, between the shoulder 24 and the gasket groove 26, is generally cylindrical, but has a slight draft taper of say 2° to facilitate mold removal. Between the gasket groove and the end face, the joint face converges outward, as at an angle of 8° to the pipe axis, to form a pilot portion 27.

The bell 10 of the pipe 12 has a joint face 30 formed by a liner ring 32 and of a size to surround the spigot joint face with a small clearance of say ⅛ inch from the spigot joint face. The joint face 30 is presented radially inward, and extends generally axially from the end face 34 of the bell 10 to a shoulder 36 in a plane normal to the axis of the pipe 12. Preferably, the joint face 30 has an outer tapered mouth portion which converges inward at an angle of approximately 20° to the axis of the pipe, and this leads to the main section of the joint face 30 which has a slight draft taper, as at an angle of about 2° to the axis of the pipe.

The liner ring 32 which is provided at the joint face 30 of the bell 10 in accordance with the present invention comprises a generally axial portion 39 with a slight taper as described above to define the main section of the joint face 30, and this portion joins a more steeply tapered outward-diverging mouth section 38. The mouth section 38 merges into an outward curved portion which leads to a radial flange 40 carrying a reversely curved and axially extending edge portion 42. At the opposite end of the joint face 30, the liner ring 32 is joined by a curved section to an inward extending radial flange 44 which leads to an axially extending edge portion 46.

Figure 3:
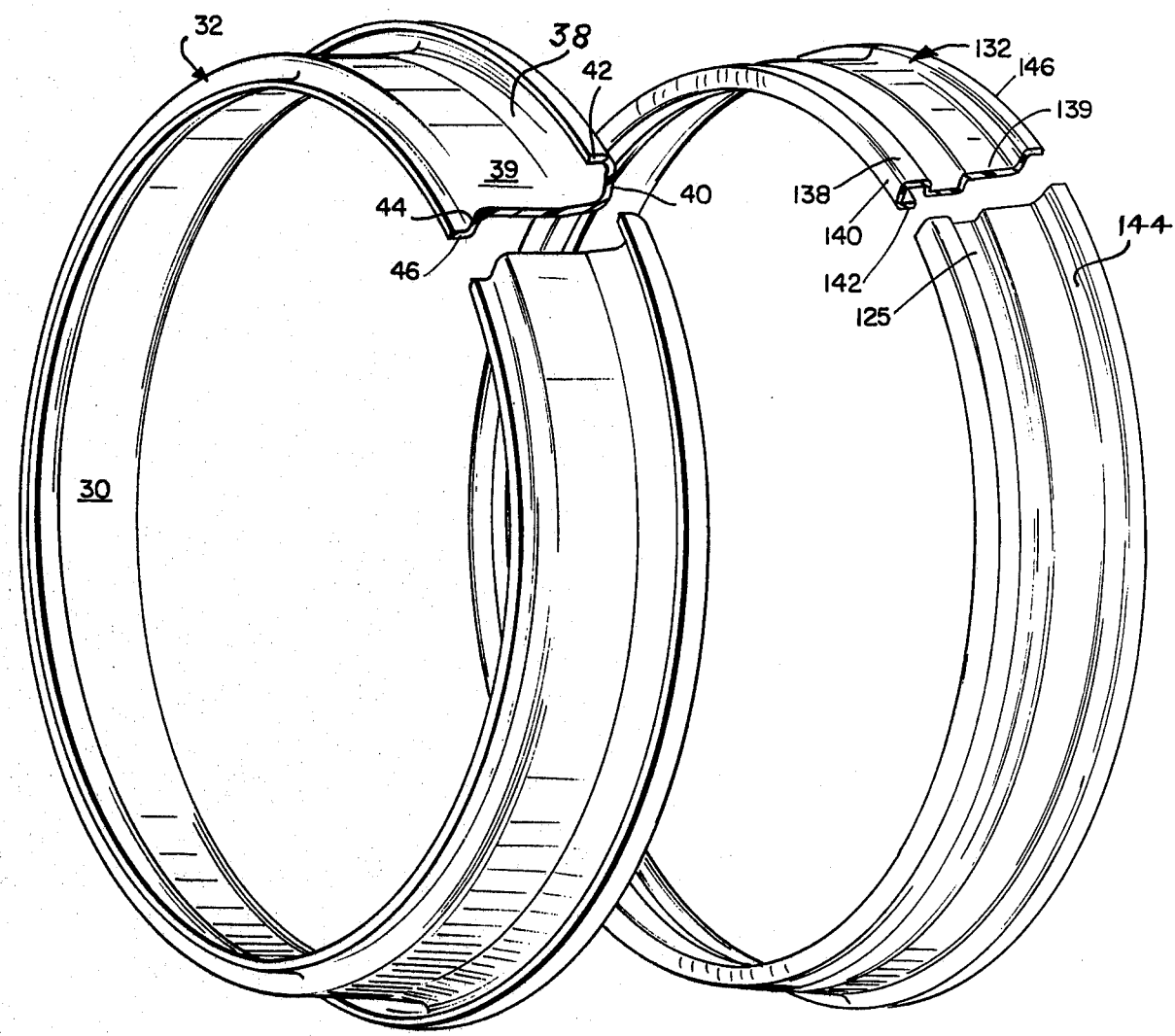
FIG. 3 is a perspective view showing a bell liner ring and a spigot liner ring in axially spaced relation.

The liner ring 32 is preformed, as described below, and the concrete of the pipe body is cast and compacted against its outer surface, so that the concrete lies tight against the outer face of the ring and against the faces of the flanges 40 and 44. The concrete also molds against and about the axial edge portions 42 and 46 of the ring so that such edge portions extend into and are buried in the body of the concrete. As shown in FIG. 3, the liner ring 32 is a circumferentially continuous ring, and its several parts, including the main joint face portion 39, the tapered mouth portion 38, the end flanges 40 and 44, and the edge portions 42 and 46, are all circumferentially continuous about the ring 32.

In assembling a joint as shown in FIG. 1, a gasket 28 is placed in the gasket groove 26 and stands above the surface of the joint face 20. The two pipe ends are telescoped together axially, with the pilot portion 27 guiding the spigot into the mouth portion 38 of the bell. As the pipes come together, the mouth portion of the liner 32 engages the gasket 28 and compresses it into the groove 26, and the main section 39 of the liner 32 then slides along the compressed surface of the gasket 28 until the end faces 22 of the spigot and 34 of the bell respectively engage and abut the shoulders 36 of the bell and 24 of the spigot. In such assembly operation, the gasket slides only on the smooth and non-abrasive surface of the liner 32. In the resulting joint, the gasket lies compressed in the gasket groove in sealing contact with spigot surfaces which are commonly of satisfactory sealing character, and compressed against the smooth and continuous surface of the liner 32. This makes a substantially improved joint.

Figure 4:
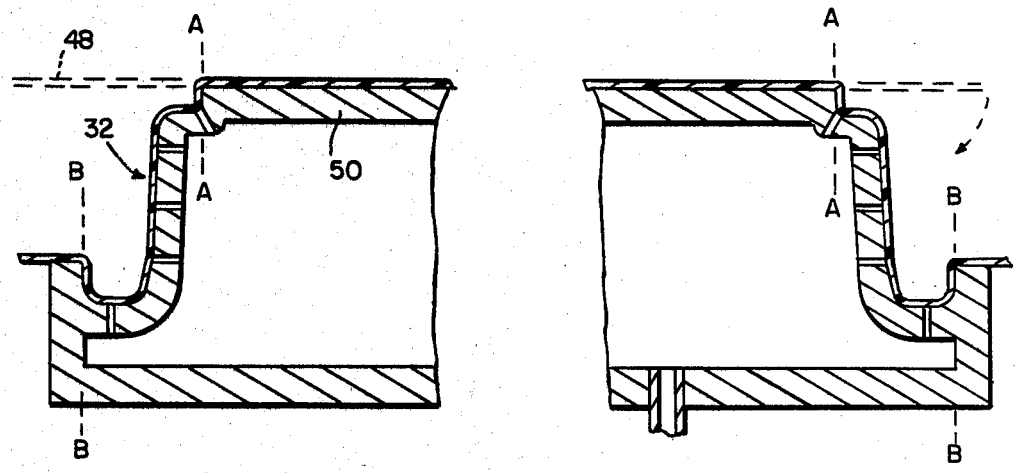
FIG. 4 is a sectional view of a vacuum die used to form liner rings from thermoplastic sheet stock.

The liner ring 32 may be made from any of a variety of known plastics materials, by any of various conventional methods for forming such materials. One convenient and preferred way of forming the ring 32 is shown in FIG. 4. A sheet 48 of thermoplastic material, for example, polystyrene or ABS, is laid on a vacuum forming mold 50, and under heat and with vacuum applied to the interior of the mold the sheet is drawn against the external mold surfaces. Such surfaces of the mold are shaped to form the desired configuration of the ring 32. The formed sheet is then removed from the mold 50 and cut at the lines A—A to remove the central web of the formed part and at the lines B—B to remove the edge or flash portions of the molded part so as to leave the ring 32 as the final product. The thus-formed ring 32 has a smooth and continuous inner face, which forms the joint face of the pipe bell when the ring is molded into the bell as shown in FIG. 1. The ring is desirably of thin-wall thickness, preferably from 0.040 to 0.060 inch, but is desirably of stiff material so that it is self-sustaining as a ring. Its primary function is to provide a smooth surface at a joint face of the pipe, where it will be fully backed and supported by the concrete cast against its surface. It is not necessary or desirable that it have sufficient physical strength to support the concrete during the casting operation, since it will be supported internally by the bell mold ring during the molding operation. The axially extending edges 42 and 46 of the ring must be sufficiently stiff to become embedded in the concrete as it is compacted in the mold. With such edges locked in place, the intermediate joint-facing portions of the ring are found to remain in tight adhering contact against the concrete molded against such portions.

Figure 2:
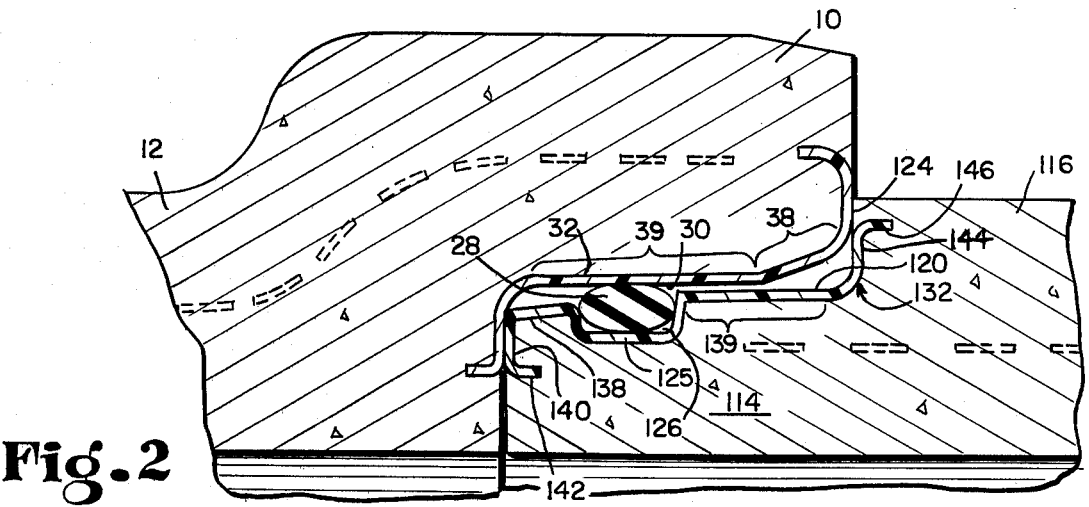
FIG. 2 is a partial section similar to FIG. 1 of a modified pipe joint in which both the bell and the spigot have liner rings in accordance with the present invention.

In the modification of FIG. 2, the pipe bell end is the same as that in FIG. 1, and comprises a bell 10 on a pipe 12, with the joint face 30 lined with a liner ring 32 as described above. The spigot 114 of the adjoining pipe 116 is also provided with a liner ring 132. Such ring 132 comprises an end flange 140 lying against the end face of the pipe 116 and having a reversely-bent edge portion 142 extending axially inward and buried in the body of the cast concrete. The flange 140 at its outer edge joins a moderately tapered guide portion 138 which is joined at its end to a channel portion 125 defining a gasket groove 126. The channel portion 125 is joined to a main body portion 139, which has a slight draft taper of about 2°. The main body portion 139 merges into a curved portion which leads to a radial flange 144 extending along the shoulder face 124 of the spigot, and the radial flange is joined to an axially extending edge portion 146 which is surrounded by and buried in the body of the concrete forming the wall of the pipe 116.

As shown in FIG. 3, the liner ring 132, like the ring 32, is a continuous ring, with each of its parts continuous around the periphery of the ring. When used as a facing on the joint face of the spigot end of a concrete pipe, it forms a circumferentially continuous and smooth surface at that joint face. Its channel section 125 makes good sealing contact with the gasket 28 of the joint throughout the entire circumference of the gasket groove 126. The spigot liner ring 132 may be made by any of various known methods, for example, by hot vacuum forming against the inner surface of a two-part vacuum mold.

Figure 5:
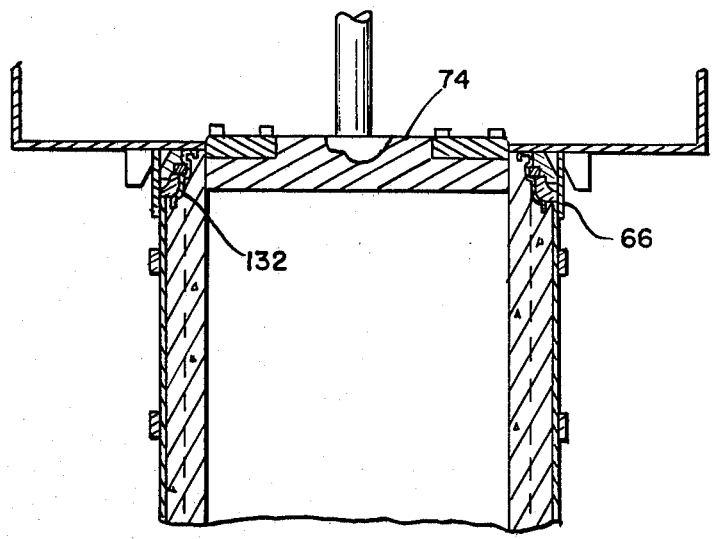
FIG. 5 is a somewhat diagrammatic view of packer head apparatus for molding concrete pipe.
Figure 6:
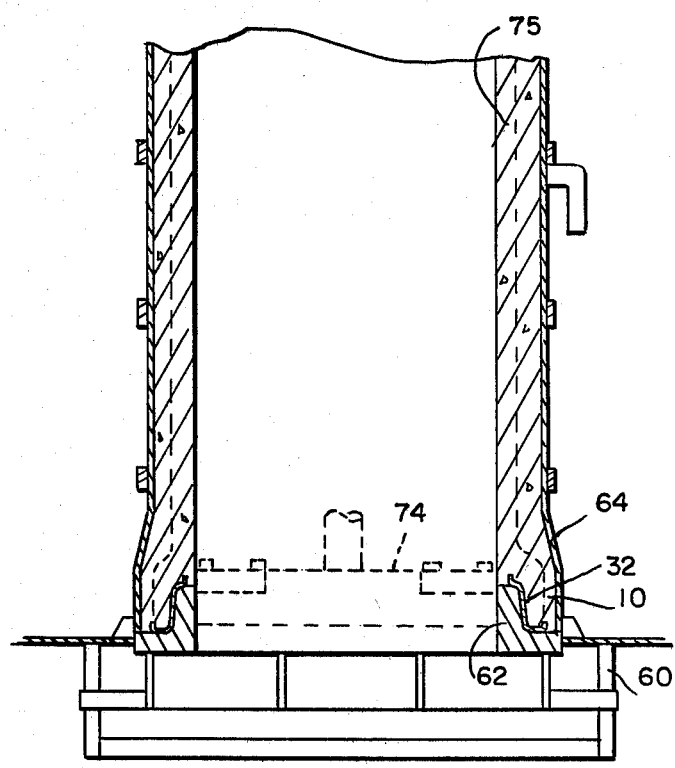
FIG. 6 is an enlarged fragmental sectional view showing a conventional prior art mold structure for molding the spigot of a concrete pipe in such packer head apparatus.
Figure 6:
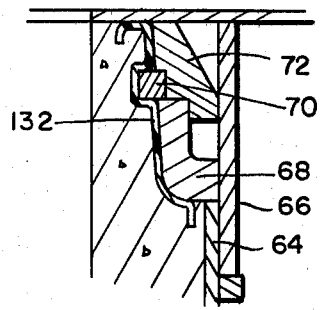

The manufacture of concrete pipe by the so-called "packer head" method is illustrated in FIG. 5. The apparatus comprises a suitable supporting base 60 on which is mounted a bell mold ring 62 to define the joint face and end face of the bell, and an outer shell or jacket 64 to define the outer surface of the pipe. In use, a liner 32 is mounted on such mold ring 62. At the top of such jacket 64 a band 66 secures a set of spigot forming rings in place. As shown on a larger scale in FIG. 6, these include a first ring 68 which rests on the top of the jacket 64, forms a mold surface for the main portion of the joint face, and supports a core ring 70 in position to enter the gasket groove of the spigot. Such core ring 70 is locked in place by a second ring 72 which fits over the first ring 68 and which forms the mold surface for the pilot end of the spigot. This spigot mold structure is representative of conventional mold structure for this purpose, and may be used with or without the use of a spigot liner ring 132. Without such liner ring, a spigot as shown in FIG. 1 will be formed, and with a liner ring 132, a spigot end as shown in FIG. 2 will be formed.

A packer head 74 is mounted for vertical and rotary motion within the mold formed by the parts 62–72. It is initially positioned at the bottom of the mold, as shown in dotted lines in FIG. 5. Concrete is supplied to its upper surface, and the packer head 74 is rotated to force the concrete outward against the jacket 64 and into the space between the liner ring 32 on the bell mold ring 62 and the lower portion of the jacket 64 so as to form the bell 10 of the pipe. Supplementary means such as vibration of the base 60 during this bell-forming part of the molding process may be employed. When the bell portion 10 has been formed, additional concrete is continuously supplied to the packer head 74 and such head is continuously rotated and progressively raised as the wall of the pipe is formed. As is known to those skilled in the art, a relatively stiff concrete mix is used which is self-sustaining once compacted against the jacket 64, so that no inner liner for the mold is necessary. This process continues until the packer head 74 reaches the upper end of the mold assembly and has compacted concrete against the liner ring 132 which is shown in FIG. 5 as mounted within the spigot ring forming structure.

With this mold structure, the bell liner ring 32 and the spigot liner ring 132 are both fully backed and supported over substantially their entire surfaces. The bell ring fits tight against the bell inner ring 62 and is supported thereby so that the relatively thin-walled ring 32 will be supported during the molding operation. Similarly, the spigot ring 132 is fully supported over substantially its entire outer surface by the mold rings 68, 70, and 72 as the concrete is compacted against its inner surface by the packer head 74.

When the molding operation is completed and the packer head 74 fully withdrawn from within the newly formed pipe and the pipe has reached a self-sustaining condition, the spigot mold rings 68–72 are removed, the jacket 64 is removed, and the newly formed pipe 75, supported at its base on the bell mold ring, is removed to a curing station where it is cured in a controlled atmosphere. When the bell mold ring is subsequently removed, the bell liner ring separates cleanly from the mold ring so as to facilitate the ring removal and avoid damage to the joint face.

Figure 7:
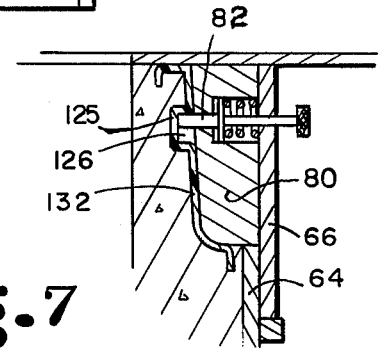
FIG. 7 is a sectional view similar to FIG. 6 but showing a liner ring in accordance with the present invention supported in packer head molding apparatus by simplified mold structure.

The use of a spigot liner ring 132 permits the use of simplified mold structure as shown in FIG. 7. Instead of the three-mold rings 68, 70, and 72 of FIG. 6, a single continuous mold ring 80 may be used. This has an inner face shaped to fit the outer face of the spigot mold ring 132 except that it does not enter the gasket groove 126 of that ring. With a spigot mold ring 132 of sufficient thickness and stiffness, the channel section 125 of the mold ring will provide the desired configuration and sufficient support against which the concrete may be compacted in the molding operation. Accordingly, it is only necessary to support the spigot liner ring 132 in proper position against the face of the continuous mold ring 80. The mold ring 80 rests upon the upper end of the jacket 64 and is held in alignment with such jacket by the peripheral band 66. To support the preformed spigot liner ring 132, the mold ring 80 has a plurality of latch fingers 82 about its circumference, each spring-pressed inward to engage in the gasket groove formed by the channel section 125 of the liner ring 132. The pipe is molded against the thus-supported liner ring 132, and the channel section of such ring provides the necessary mold shape, without the use of a core ring as in FIG. 6. The mold ring 80 may be removed by retracting the latch fingers 82 out of engagement with the gasket grooves 126 and sliding the ring 80 axially off the spigot end of the pipe. The draft taper on the mold ring 132 and the spigot formed against it facilitates such axial removal.

Operation is as follows: Sections of concrete pipe are formed by any of various conventional molding methods, in a mold in which a liner ring or rings are mounted in advance. Such methods are exemplified by the packer head method illustrated in FIG. 5. The mold includes a bell mold ring for forming the pipe bell and spigot mold structure for forming the spigot of the pipe. A preformed, thin-walled bell liner ring 32 is placed over the bell mold ring, and if desired, a preformed thin-walled spigot liner ring 132 is placed within the spigot mold structure. Concrete is then compacted in the mold against the exposed surfaces of the mold and the liner rings 32 and 132. The concrete is molded about and buries the axially extending edge portions 42 and 46 of the ring 32 and edge portions 142 and 146 of the liner ring 132, so as to lock and seal the liner ring or rings to the pipe. When the mold parts supporting the liner rings 32 and 132 are later removed, the liner rings remain fixed against the molded joint faces at the bell and spigot of the pipe, and their presence facilitates such removal and avoids damage to the joint faces.

Pipe sections so formed are joined end to end to form joints therebetween as shown in FIGS. 1 and 2. In forming a joint as shown in FIG. 1, a gasket 28, such as an O-ring gasket, is placed in the gasket groove 26 on the spigot 14 of the pipe 16, and the joint-forming portions of that pipe 16 and its adjoining pipe 12 are telescoped together. The tapered pilot portion 27 of the spigot enters the tapered mouth 38 of the bell, and guides the O-ring 28 into that tapered mouth 38. The converging tapered wall of the mouth 38 compresses the gasket 28 into its groove 26, and the gasket slides along the main section 39 of the liner 32 to the position shown in FIG. 1. In such sliding movement, the gasket 28 rides on the smooth and non-abrasive surface of the liner ring 32, and scarring and other damage to the gasket is avoided. The joint face formed by the liner ring 32 is smooth and continuous, both axially and circumferentially, so that the O-ring gasket 28 makes a circumferentially complete and tight seal with that joint face. While the spigot gasket groove is unlined, such grooves are commonly molded with satsifactory seal surfaces, and the gasket engages the groove only in compression and not in sliding contact. Accordingly, it has been found that a liner on the bell joint surface is the more important and that good joints are formed with a liner only on the bell surface and not on the spigot.

A joint as shown in FIG. 2 is made in a similar manner. In this case, the outward-presented joint face 120 of the spigot 114 is lined with a liner ring 132, which provides a smooth and non-abrasive and continuous surface over the entire area of the joint face, both circumferentially and axially. As the two pipes are brought together, any contact between the joint faces is between surfaces lined with the liner rings of plastics material which are both smooth and non-abrasive, so that neither joint face is damaged by rubbing or sliding contact with an abrasive concrete surface on the other part. As in FIG. 1, the gasket 28 is compressed by the converging tapered mouth 38 as it enters the bell, and then slides along the smooth surface of the liner 32 to its sealing position as shown in FIG. 2. In this case, the entire sealing engagement between the gasket and the two pipes is at surfaces which are lined with liners of plastics material, which provides sealing surfaces of smooth and continuous character so that especially good sealing is obtained. Moreover, use of a liner on the spigot may simplify the pipe mold structure and avoid the need for radially-separable mold parts for the spigot.

I claim:

1. A concrete pipe, comprising
   a tubular wall having a bell end and a spigot end, the bell end having a circumferentially continuous joint face presented radially inward and extending axially of the pipe, and the spigot end having a circumferentially continuous joint face presented radially outward and extending axially of the pipe,
   said joint faces being complementary so as to form a joint between adjoining pipes in a string of such pipes with the spigot end of one received in the bell end of another and sealed with a gasket therebetween,
   a liner ring of plastics material lining one of said radially-presented joint faces, said ring having a face-lining portion lying against the gasket-engaging surface thereof, a flange portion extending radially from said face-lining portion and along a radial face of the pipe, and an edge portion extending axially from the flange portion,
   the concrete of the pipe being molded against one face of the face-lining portion and the flange portion and about the edge portion so that such edge portion extends into and is buried in the molded concrete.

2. A concrete pipe as in claim 1, in which said edge portion of the liner ring is formed as a circumferentially-continuous, axially-extending collar or the like displaced from alignment with the face lining portion of the ring and extending into and buried in the body of concrete molded against the ring.

3. A concrete pipe, comprising
   a tubular wall having a bell end and a spigot end, the bell end having a circumferentially continuous joint face presented radially inward and extending axially of the pipe, and the spigot end having a circumferentially continuous joint face presented radially outward and extending axially of the pipe,
   said joint faces being complementary so as to form a joint between adjoining pipes in a string of such pipes with the spigot end of one received in the bell end of another and sealed with a gasket therebetween,
   a thin-walled liner ring of plastics material lining one of said radially-presented joint faces and having a face-lining portion lying against the gasket-engaging surface thereof,
   the concrete of the pipe being molded against the liner ring and the ring having an edge portion extending into and buried in the molded concrete so as to secure the ring in place, and wherein said liner ring extends to the end face of the pipe and there extends radially along the end face and thence in a reversely bent collar portion defining a circumferential channel between itself and the face-lining portion of the ring, the concrete being molded into such channel and about such collar.

4. A concrete pipe as in claim 3 in which the edge of the liner ring opposite from said first-named edge portion extends into and is buried in the molded concrete.

5. A concrete pipe as in claim 1 in which said liner ring extends to a shoulder on said pipe and said flange portion extends radially along the face of such shoulder and thence axially as a collar or the like offset from the face-lining portion, the concrete being molded against such flange and about such collar.

6. A concrete pipe, comprising
   a tubular wall having a bell end and a spigot end, the bell end having a circumferentially continuous joint face presented radially inward and extending axially of the pipe, and the spigot end having a circumferentially continuous joint face presented radially outward and extending axially of the pipe,
   said joint faces being complementary so as to form a joint between adjoining pipes in a string of such pipes with the spigot end of one received in the bell end of another and sealed with a gasket therebetween,
   a thin-walled liner ring of plastics material lining one of said radially-presented joint faces and having a face-lining portion lying against the gasket-engaging surface thereof,
   the concrete of the pipe being molded against the liner ring and the ring having an edge portion extending into and buried in the molded concrete so as to secure the ring in place,
   and wherein the liner ring extends axially between the end face of the pipe to a shoulder thereon and is formed at its outer edge to extend as a flange along the end face of the pipe and thence in a reversely bent collar portion, and formed at its inner edge to extend as a flange along the surface of the shoulder and thence axially as a collar or the like offset from the face lining portion, the concrete being molded against such flange portions and about such collars to secure the edges of the liner ring in place.

7. A concrete pipe, comprising
a tubular wall having a bell end forming a circumferentially-continuous joint face presented radially inward and extending axially of the pipe, such bell being adapted to receive a pipe spigot and to be sealed thereto by a gasket,
a thin-walled liner ring of plastics material lining said joint face, said ring having a face lining portion lying against the gasket-engaging surface thereof, a flange portion extending radially from said face-lining portion and along a radial face of the pipe, and an edge portion extending axially from the flange portion,
the concrete of the pipe being molded against one face of the face-lining portion and the flange portion and about the edge portion so that such edge portion extends into the concrete molded thereabout.

8. A concrete pipe as in claim 7 in which said edge portion of the liner ring is formed as a circumferentially-continuous axially-extending collar or the like displaced from alignment with the face lining portion of the ring and extending into and buried in the body of concrete molded against the ring.

9. A concrete pipe, comprising
a tubular wall having a bell end forming a circumferentially-continuous joint face presented radially inward and extending axially of the pipe, such bell being adapted to receive a pipe spigot and to be sealed thereto by a gasket,
a liner ring of plastics material lining said joint face and having a face lining portion lying against the gasket-engaging surface thereof,
the concrete of the pipe being molded against the liner ring and the liner ring having a portion displaced from alignment with such face-lining portion and extending into the concrete molded thereagainst so as to secure the ring in place,
and wherein said liner ring extends to the end face of the pipe and there extends radially along the end face and thence in a reversely bent collar portion defining a circumferential channel between itself and the face-lining portion of the ring, the concrete being molded into such channel and about such collar.

10. A concrete pipe as in claim 7 in which said liner ring extends to a shoulder on said pipe and said flange portion extends radially along the face of such shoulder and thence axially as a collar or the like offset from the face-lining portion, the concrete being molded against such flange and about such collar.

11. A concrete pipe as in claim 9 in which the liner ring extends axially from the end face of the pipe to a shoulder thereon and is formed at its inner edge to extend as a flange along the surface of the shoulder and thence axially as a collar or the like offset from the face lining portion, the concrete being molded against such flange portion and about such last-named collar to secure the inner edge of the liner ring in place.

12. A concrete pipe as in claim 11 in which said liner ring includes an outer mouth portion of inward-converging conical shape which merges at its inner end with a generally cylindrical main body portion, the mouth portion being adapted to guide a gasket to said main body portion as the bell engages a spigot to make a joint therewith, and to compress the gasket between the bell and spigot.

13. A concrete pipe, comprising
a tubular wall formed at its end with a circumferentially-continuous joint face presented radially of the pipe and extending axially thereof, such face being adapted to be telescopically engaged with a complementary face on an adjoining pipe and sealed thereto by a gasket,
a liner ring of plastics material lining said joint face, said ring having a face lining portion lying against the gasket-engaging surface thereof, a flange portion extending radially from said face-lining portion and along a radial face of the pipe, and an edge portion extending axially from the flange portion,
the concrete of the pipe being molded against the face-lining portion and flange portion of the liner ring and about the edge portion thereof so that such edge portion extends into the concrete so as to secure the edge of the ring in place.

14. A concrete pipe as in claim 13 in which the edge of the liner ring opposite from said first-named edge portion extends into and is buried in the molded concrete.

15. A concrete pipe, comprising
a tubular wall formed at its end with a circumferentially-continuous joint face presented radially of the pipe and extending axially thereof, such face being adapted to be telescopically engaged with a complementary face on an adjoining pipe and sealed thereto by a gasket,
a thin-walled liner ring of plastics material lining said joint face and having a face lining portion lying against the gasket-engaging surface thereof,
the concrete of the pipe being molded against the liner ring and the liner ring having a portion displaced from alignment with such face-lining portion and extending into the concrete molded thereagainst so as to secure the ring in place,
and wherein the liner ring extends axially between the end face of the pipe to a shoulder thereon and is formed at its outer edge to extend as a flange along the end face of the pipe and thence in a reversely bent collar portion, and formed at its inner edge to extend as a flange along the surface of the shoulder and thence axially as a collar or the like offset from the face lining portion, the concrete being molded against such flange portions and about such collars to secure the edges of the liner ring in place.

16. A concrete pipe as in claim 13 in which the liner ring is a preformed ring of plastics material having a wall thickness of from 0.030 inch to 0.100 inch.

17. A concrete pipe as in claim 15 in which the liner ring is a preformed ring of plastics material having a wall thickness of from 0.030 inch to 0.100 inch.

18. A concrete pipe as in claim 15 in which the liner ring is a preformed ring of plastics material having a wall thickness of from 0.040 to 0.060 inch.

19. A concrete pipe as in claim 13 in which the joint face is presented radially-outward and is formed with a gasket groove opening outward and adapted to receive a gasket therein, the liner ring being formed with a channel section lining such groove.

20. A joint between pipes molded of concrete or the like, comprising a bell on one pipe having an axially-extending joint face presented radially inward of the pipe, a spigot on an adjoining pipe having an axially-extending joint face presented radially outward of the pipe, said spigot being received within a bell to form a joint therebetween, one of the joint faces being formed with a gasket groove, a thin-walled liner ring of plastics material on the other joint face and having a face lining portion which forms an axially continuous smooth surface from the end of the pipe inward past said groove, over which a gasket may slide as the joint is assembled, and a gasket received in the gasket groove and compressed between a wall of such groove and such smooth and continuous surface of said liner ring.

21. A joint as in claim 20 in which the liner ring is on the inner face of the bell joint face, extends from the gasket-engaging portion thereof to the end face of the pipe and has an inward converging mouth portion at its outer end so as to form a liner surface along which the gasket slides and is compressed as the pipes are brought together to form the joint.

22. A joint as in claim 20 in which said liner ring extends to the end of the pipe and there extends radially outward along the end face of the pipe and thence in a reversely-bent collar portion defining a circumferential channel between itself and the face-lining portion of the ring, the concrete being molded into such channel and about such collar.

* * * * *